United States Patent
Puram et al.

(10) Patent No.: US 12,511,343 B2
(45) Date of Patent: Dec. 30, 2025

(54) HETEROGENOUS MULTI-TENANT WEB APPLICATION ELEMENTS HANDLER

(71) Applicant: Dell Products L.P., Round Rock, TX (US)

(72) Inventors: Subhashini Puram, Hyderabad (IN); Shibi Panikkar, Bangalore (IN); Aashna Mohapatra, Bhubaneswar (IN); Ambarish Roy, Guwahati (IN)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/321,048

(22) Filed: May 22, 2023

(65) Prior Publication Data
US 2024/0394323 A1  Nov. 28, 2024

(51) Int. Cl.
*G06F 17/00* (2019.01)
*G06F 16/958* (2019.01)
*G06F 40/143* (2020.01)

(52) U.S. Cl.
CPC .......... *G06F 16/986* (2019.01); *G06F 40/143* (2020.01)

(58) Field of Classification Search
CPC .... G06F 16/986; G06F 16/143; G06F 40/143; G06F 11/3688; G06F 11/3698; G06F 11/3684; G06F 11/368; G06F 9/451; G06F 11/3414
USPC ........................................................ 715/234
See application file for complete search history.

(56) References Cited

U.S. PATENT DOCUMENTS

| | | | | |
|---|---|---|---|---|
| 8,984,101 | B1* | 3/2015 | Viswanath | H04L 67/1008 709/223 |
| 10,977,168 | B1* | 4/2021 | Sanevelly | G06F 11/3696 |
| 2010/0332968 | A1* | 12/2010 | Squillace | G06F 9/542 717/114 |
| 2011/0154187 | A1* | 6/2011 | Sadowski | G06F 16/972 715/235 |
| 2011/0173555 | A1* | 7/2011 | Miyoshi | G06F 40/166 715/770 |
| 2013/0174125 | A1* | 7/2013 | Trim | G06F 11/3672 717/124 |
| 2015/0286652 | A1* | 10/2015 | Charles | G06Q 50/06 700/291 |

(Continued)

OTHER PUBLICATIONS

U.S. Appl. No. 18/495,02, filed Oct. 26, 2023, Panikkar et al.

*Primary Examiner* — Jason T Edwards
(74) *Attorney, Agent, or Firm* — DALY, CROWLEY, MOFFORD & DURKEE, LLP

(57) ABSTRACT

An example methodology includes, by a computing device, analyzing an application to identify one or more elements in the application and, for each element of the one or more elements, an attribution of the element. The method also includes, for each element of the one or more elements, by the computing device, determining an attribute of the element which is a non-duplicate attribute, creating a first accessibility to the element by the non-duplicate attribute, creating a second accessibility to the element by XPath, and storing the first accessibility and the second accessibility created for the element within a central repository. The method may also include, by the computing device, generating a handler class for an element of the one or more elements in the application, wherein the handler class contains code for accessing the element, and providing the generated handler class to another computing device.

17 Claims, 9 Drawing Sheets

(56) References Cited

U.S. PATENT DOCUMENTS

| | | | |
|---|---|---|---|
| 2021/0049234 A1* | 2/2021 | Kumar | G06F 40/117 |
| 2021/0374040 A1* | 12/2021 | Kumar | G06F 11/3688 |
| 2022/0066916 A1* | 3/2022 | Mcquee | G06F 9/451 |
| 2022/0283791 A1* | 9/2022 | Amashta | G06F 8/51 |
| 2023/0195825 A1* | 6/2023 | Rao | G06F 16/986 |
| | | | 715/235 |

* cited by examiner

HETEROGENOUS MULTI-TENANT WEB APPLICATION ELEMENTS HANDLER

BACKGROUND

Web application testing is the process of ensuring quality by testing that the functionality of a given web application is working as intended. Testing allows a developer of a web application to identify and fix bugs (defects) in the web application before they cause problems for users. By verifying that the web application is functioning properly, the web application developer can ensure that customers or users have a positive experience when using the web application. Organizations may desire to test the functionality of web applications, including the web elements, prior to releasing the web applications to production environments.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, analyzing an application to identify one or more elements in the application and, for each element of the one or more elements, an attribution of the element. The method also includes, for each element of the one or more elements, by the computing device, determining an attribute of the element which is a non-duplicate attribute, creating a first accessibility to the element by the non-duplicate attribute, creating a second accessibility to the element by XPath, and storing the first accessibility and the second accessibility created for the element within a central repository.

In some embodiments, analyzing the application includes examining a Document Object Model (DOM) structure of one or more pages of the application.

In some embodiments, the first accessibility includes a CSS Selector. In one aspect, the CSS Selector includes one of a CSS Selector by Name, a CSS Selector by ID, and a CSS Selector by Label.

In some embodiments, the method also includes, by the computing device, generating a handler class for an element of the one or more elements in the application, wherein the handler class contains code for accessing the element, and providing the generated handler class to another computing device.

In one aspect, the handler class is based on an accessibility to the element selected for the handler class.

In one aspect, the handler class is based on a test automation tool specified for the handler class.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Web application testing entails the testing of elements of a web application to ensure that the application is fully functional. For example, a test engineer can manually perform the testing by launching the application, identifying the elements on the pages of the application to test, and clicking the elements to complete the test processes to verify that the elements function as intended. As this can be a tedious task, many organizations resort to application testing automation. Application testing automation is the concept of using software, such as automated test scripts, separate from the application being tested to control the execution of tests on an application. For example, many organizations use test automation tools, such as SELENIUM and APPIUM, to test their applications. However, even with such tools, the effort and expertise of the test automation engineer is needed to create accurate locators for the individual elements for use in test automation.

Disclosed herein are computer-implemented structures and techniques for automated generation and management of locators for web elements (sometimes referred to herein more simply as "elements") for testing automation on the various pages of an application (e.g., a web application). The generation and management of locators can be achieved, according to some embodiments, by analyzing (or "examining") the Document Object Model (DOM) structure of a page of an application to identify the elements, determining the attribution of the individual elements, removing the duplicate attributes, and creating the XPaths and CSS Selectors for the elements using the non-duplicate attributes. The XPaths and CSS Selectors created for the individual elements can then be used to generate handler classes to access the element uniquely for a given application and page. Some embodiments can generate a hierarchical representation of the elements in an application, including the attribution available to each element, and store the hierarchical representation within a central web element repository configured to support heterogenous element locator demands. The various embodiments of the structures and techniques disclosed herein advantageously enable test automation engineers to focus on test automation development rather than having to locate elements on a page, determine the attribution of the elements, and decide the method to use to access the elements based on the attribution for the different test execution flows and mechanisms. This in turn increases the test coverage provided by the test automation as well as the efficiency and utility of the computing systems utilized for the test automation. Numerous aspects and features are described in detail below and will be apparent in light of this disclosure.

Figure 1:
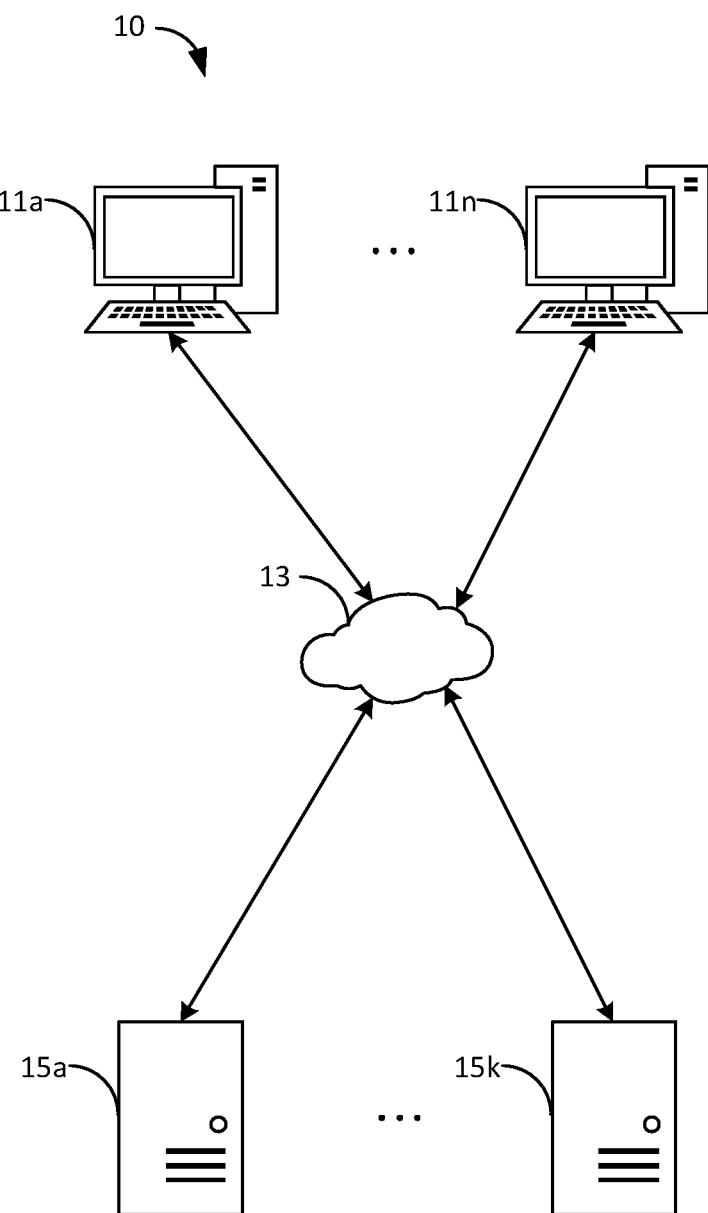
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to as a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
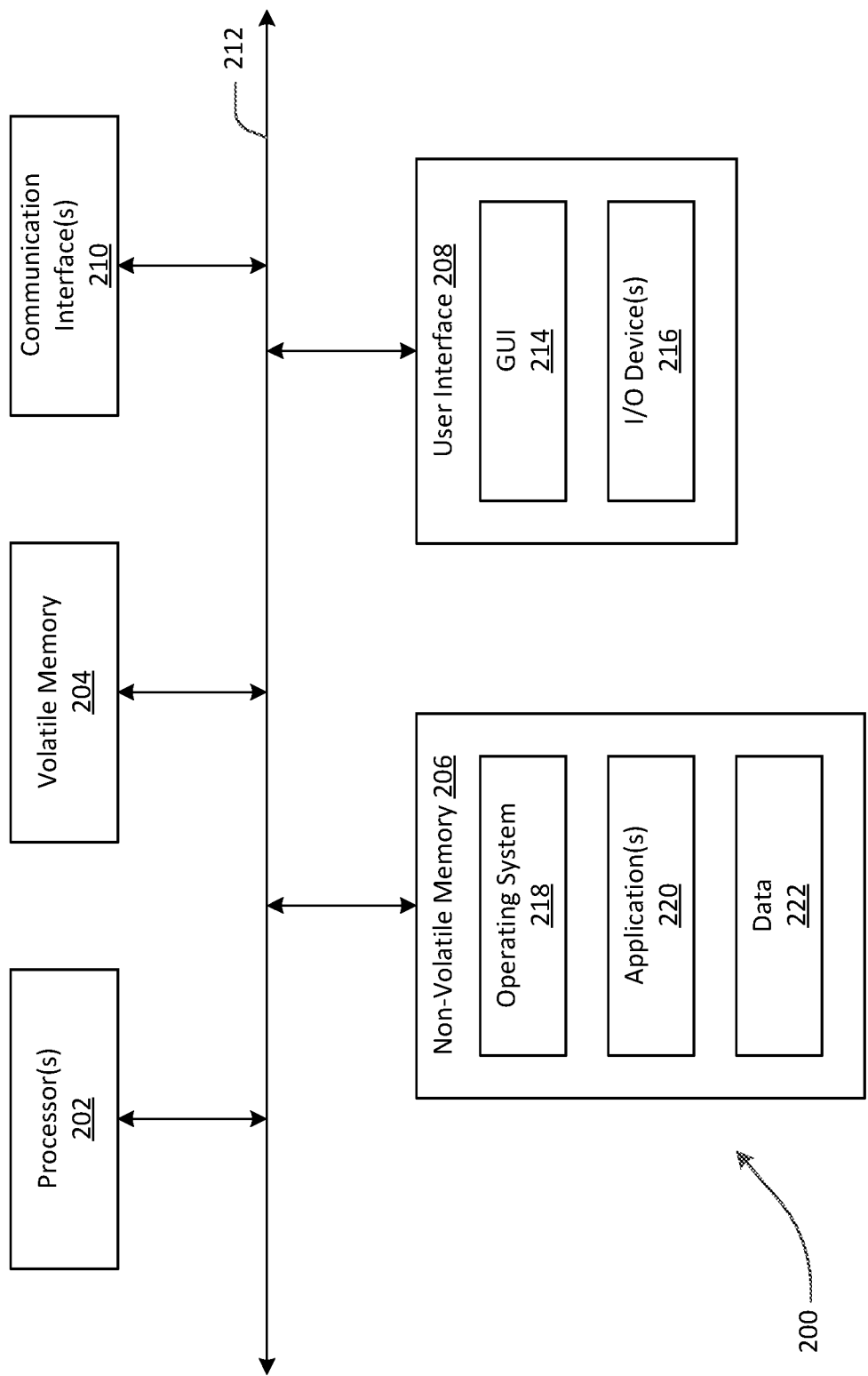
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 7). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital, or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
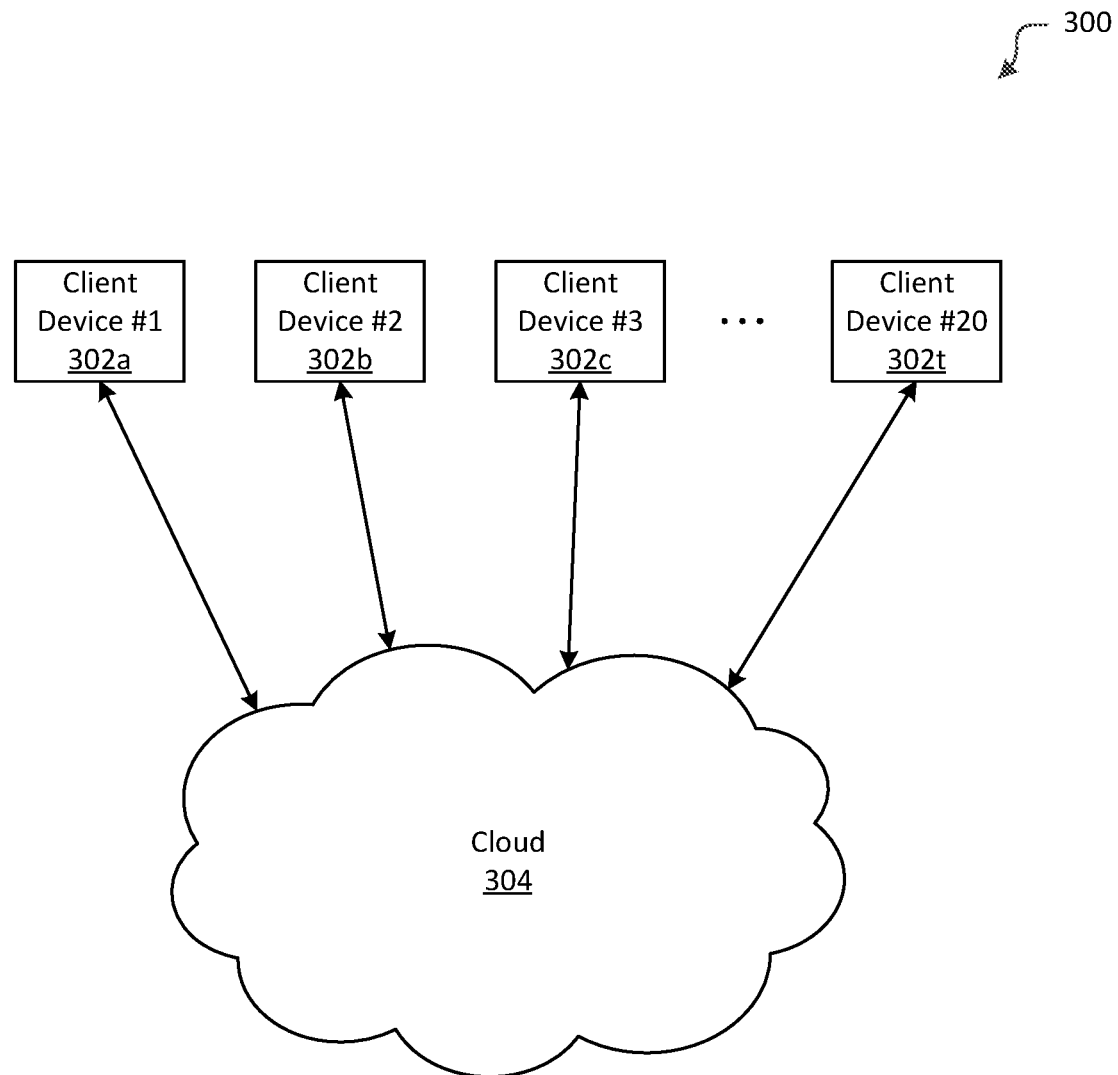
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (Saas), Platform as a Service (PaaS), Infrastructure as a Service (IaaS), and/or Desktop as a Service (DaaS), for example. IaaS may refer to a user renting the use of infrastructure resources that are needed during a specified period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
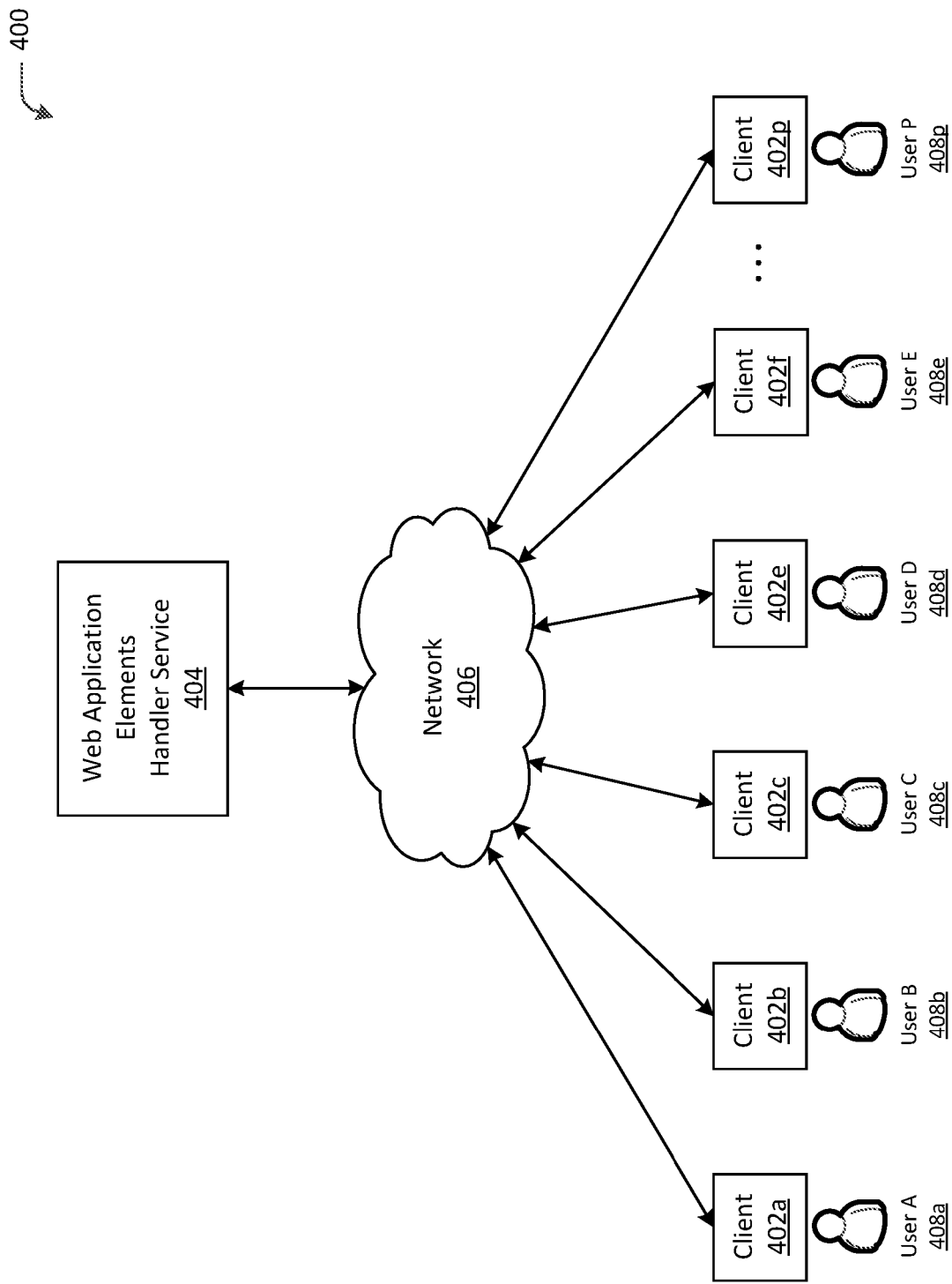
FIG. 4 is a diagram of an illustrative network environment in which a heterogenous multi-tenant web application elements handler service for testing automation may be implemented, in accordance with an embodiment of the present disclosure.

FIG. 4 is a diagram of an illustrative network environment 400 in which a heterogenous multi-tenant web application elements handler service for testing automation may be implemented, in accordance with an embodiment of the present disclosure. As shown, illustrative network environment 400 includes clients 402a, 402b, 402c, 402d, 402e, 402f, . . . , 402p (402 generally) and a web application elements handler service 404. Clients 402 may be configured to communicate with web application elements handler service 404 via one or more networks 406. For example, clients 402 may correspond to client machines 11 of FIG. 1 and network 406 may correspond to networks 13 of FIG. 1. Web application elements handler service 404 may be provided as a service (e.g., microservice) within cloud computing environment 300 of FIG. 3.

Clients 402a, 402b, 402c, 402d, 402e, 402f, . . . , 402p may be used by or otherwise associated with users 408a, 408b, 408c, 408d, 408e, 408f, . . . , 408p (408 generally), respectively. Users 408 may correspond to test automation engineers or other associate within or associated with an organization, accessing the services provided web application elements handler service 404. Clients 402 can include, for example, desktop computing devices, laptop computing devices, tablet computing devices, and/or mobile computing devices. Clients 402 can be configured to run one or more client applications, such as a web client and/or a dedicated application, operable to communicate with web application elements handler service 404. While clients 402a, 402b, 402c, 402d, 402e, 402f, . . . , 402p and corresponding users 408a, 408b, 408c, 408d, 408e, 408f, . . . , 408p are shown in FIG. 4, the structures and techniques sought to be protected herein can be applied to any number of users and clients.

In the example of FIG. 4, user 408a may use client 402a to send or otherwise provide an application to web application elements handler service 404 for generation of locators for elements in the application. One or more other users 408 may use their clients 402 to also send applications to web application elements handler service 404 for generation of locators for elements in the applications. To generate the locators for an application, according to some embodiments, web application elements handler service 404 may assign a unique identifier to the application and to the individual pages of the application. This enables the elements on a page to be identified uniquely across all the pages and the applications maintained within web application elements handler service 404. Web application elements handler service 404 may then analyze the application to identify the elements and the attributes of the elements in the application. In one implementation, the DOM structure of the individual pages of the application may be examined to identify the elements on the page including the attributes of the elements (e.g., the attributes linked to or otherwise associated with the elements on the page). For each element on the page, web application elements handler service 404 may use the attributes linked to the element (i.e., element attribution) to create the XPath and CSS Selectors for the element. Web application elements handler service 404 may then store the identified elements, the attributes, and the XPath and CSS Selectors created for the elements within a central web element repository. In some embodiments, a hierarchical representation of the elements on a page, along with the element attribution, may be stored within the central web element repository. In some embodiments, the XPath and CSS Selectors created for an element may be validated for effectiveness in uniquely identifying or addressing (or "locating") the element, and the XPath and CSS Selectors that are validated stored within the central web element repository, for example, as locators for the element. A locator for an element can be understood to be an accessibility of the element (accessibility to the element).

Note that uniquely identifying the application enables web application elements handler service 404 to handle large numbers of applications. Also note that this enables web application elements handler service 404 to maintain elements and their attribution across multiple different applications. For example, multiple users 408 using their clients 402 and, in some cases, very large numbers of users 408 using their clients 402 can send applications to web application elements handler service 404 for generation of locators for elements in the applications. web application elements handler service 404 can receive applications form multiple users 408 using clients 402. Additionally, the applications sent to web application elements handler service 404 may be developed using various development environments, such as, Eclipse, VISUAL STUDIO, and Jupyter, to provide a few examples, and/or programming languages, such as JAVA, C #, and PYTHON, to provide a few examples.

In some embodiments, web application elements handler service 404 may provide a UI, including UI elements/controls, for generating handler classes for accessing elements stored within the central web element repository. A handler class contains the code (e.g., programming instructions) for accessing one or more elements. The provided UI allows users 408 using clients 402 to access the UI to generate handler classes for accessing various elements in various applications. For example, user 408a may be developing an automation script (e.g., an automated test case) to test one or more elements in an application. To create the code for accessing the elements that need testing, user 408a may use client 402a and access the UI of web application elements handler service 404. Using the various elements/controls provided in the UI, user 408a can specify the name of the application (application name) and the page (page number) that is of interest (e.g., specify the application and the page that contains the elements that is of interest). In response, the UI may show a list of elements that are linked with the specified page of the application along with UI controls for selecting the elements. The elements in the list are the elements identified by web application elements handler service 404 as being on the page. User 408a can then use the provided UI controls to select the elements that are of interest (e.g., select the elements that need to be accessed). In response to the selection of one or more elements, for each selected element, the UI may show the locators that are available for the element (e.g., the accessibility of the element) along with UI controls for selecting one of the locators. For example, the UI may show that an element is accessible (i.e., can be located) using XPath, the name attribute, and the identifier attribute. The UI may also show a UI control for specifying a test automation tool (e.g., an integrated development environment (IDE)) that is being used to generate the test scripts. Using these and other UI controls, user 408a can select a locator for each element and specify the test automation tool. User 408a can then click/tap a UI element/control to request generation of handler classes for the selected elements. In response to the user's input (i.e., input by user 408a), web application elements handler service 404 can generate the handler classes for the selected elements based on the selected accessibility and specified test automation tool, and provide the generated handler classes to user 408a, for example, via the UI. User 408a can then include the handler classes in the test scripts.

Web application elements handler service 404 may use the specified test automation tool to determine the programming language that is to be used in generating the handler classes. For example, if user 408a specifies SELENIUM as the test automation tool, web application elements handler service 404 can generate the handler classes for the selected elements in JAVA. If a different test automation tool is specified, web application elements handler service 404 can generate handler classes for the elements in a programming language supported by or compatible with the specified test automation tool. For example, if user 408a or any of other users 408 (e.g., user 408b) selects one or more elements and specifies VISUAL STUDIO as the test automation tool, web application elements handler service 404 can generate the handler classes for the selected elements in C #. In this way, web application elements handler service 404 supports heterogenous test automation tools (e.g., provides support for heterogenous locator demands).

In some embodiments, web application elements handler service 404 may generate a handler class for each element. For instance, in the example above, if user 408a selects two elements, a button and an input box, web application elements handler service 404 may generate one handler class for accessing the button and another handler class for accessing the input box. In other embodiments, web application elements handler service 404 may generate a single handler class (i.e., a page handler class) for all the selected elements. For instance, in the example above, if user 408a selects three elements, a button, an input box, and a list box, web application elements handler service 404 may generate one handler class for accessing the button, the input box, and the list box. That is, the generated single handler class contains the code for accessing the three elements, button, input box, and list box. The elements selected by a user may be on a single page of an application or multiple pages of the application.

Figure 5:
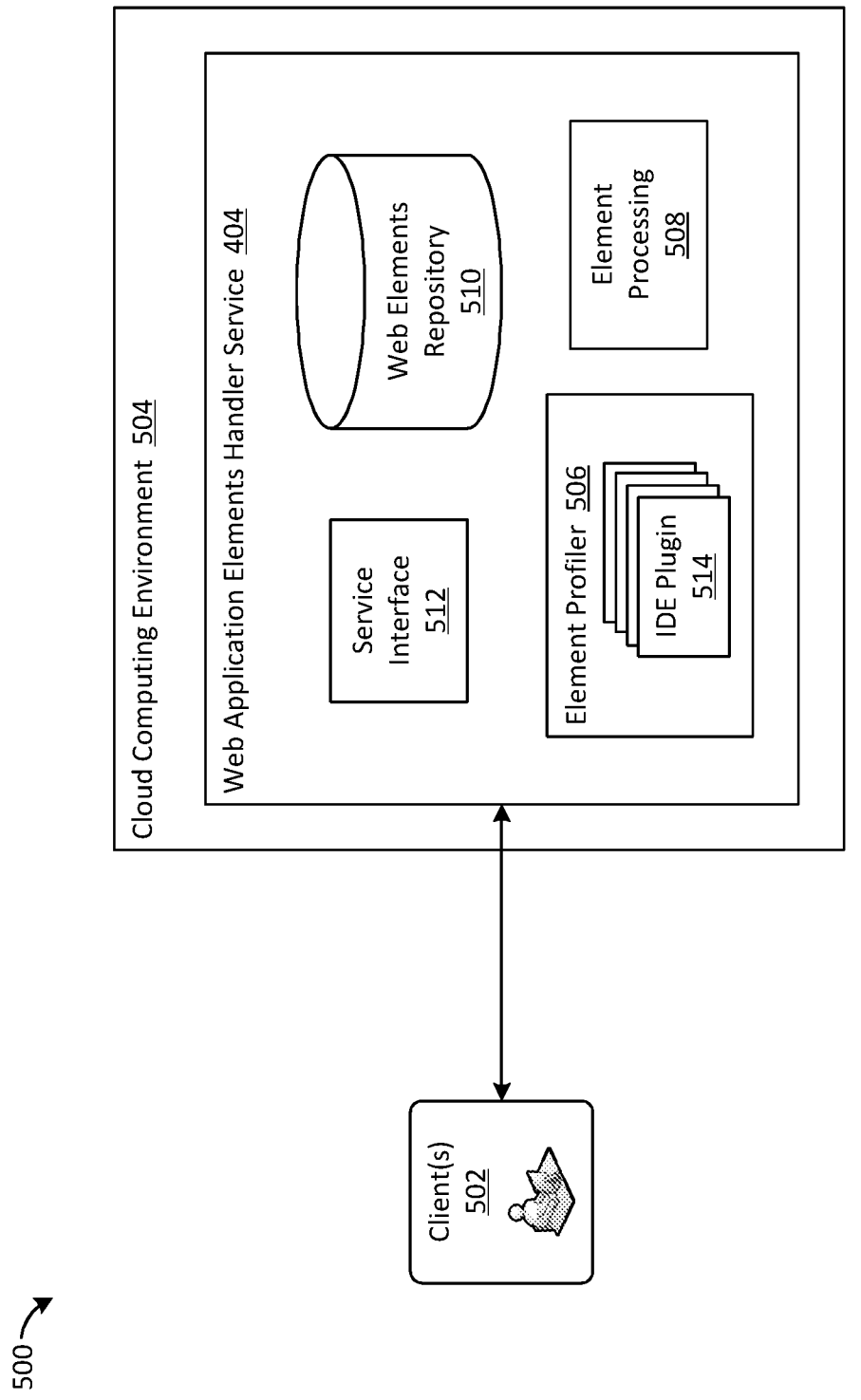
FIG. 5 is a block diagram of an illustrative system for heterogenous multi-tenant web application elements handling, in accordance with an embodiment of the present disclosure.

Referring now to FIG. 5, and with continued reference to FIG. 4, shown is a block diagram of an illustrative system 500 for heterogenous multi-tenant web application elements handling, in accordance with an embodiment of the present disclosure. Illustrative system 500 includes one or more clients 502 configured to communicate with web application elements handler service 404 via one or more networks. Client 502 of FIG. 5 can be the same as or similar to client 402 of FIG. 4.

As shown in FIG. 5, web application elements handler service 404 can be provided as a service (e.g., a microservice) within a cloud computing environment 504, which may be the same as or similar to cloud computing environment 300 of FIG. 3. For example, an organization such as a company, an enterprise, or other entity that develops and/or tests applications (e.g., web applications), for instance, may implement and use web application elements handler service 404 to generate handler classes for accessing elements contained in applications. To promote clarity in the drawings, FIG. 5 shows a single client 502 communicably coupled to web application elements handler service 404. However, embodiments of web application elements handler service 404 can be used to service many clients (e.g., clients 502) associated with one or more organizations and/or users.

Clients 502 may include any type of client devices configured to install and/or run applications (or "apps"). For example, a representative client 502 may run a client application, such as a web client or a dedicated application, that a user can use to access and interact with web application elements handler service 404. The client application and/or web application elements handler service 404 may be implemented as computer instructions executable to perform the corresponding functions disclosed herein. In the example of FIG. 5, web application elements handler service 404 can include an element profiler 506, an element processing module 508, a web elements repository 510, and a service interface module 512.

Referring to web application elements handler service 404, element profiler 506 is operable assign a unique identifier to the individual applications and to the individual pages of the application. For example, for each application received by web application elements handler service 404, element profiler 506 can generate an identifier that uniquely identifies the application within web application elements handler service 404 and assign the generated identifier to the application. Element profiler 506 can also assign an identifier to the individual pages of the application to uniquely identify the page within the application. Uniquely identifying applications and the pages in the individual applications enables the elements on a page to be identified uniquely across all the pages and applications maintained within web application elements handler service 404.

Element profiler 506 is also operable to analyze applications to identify the elements and the attributes of the elements contained in the applications. To this end, as can be seen in FIG. 5, element profiler 506 may include one or more IDE plugins 514. A plugin is software code that adds a specific feature or functionality to an existing application or program. IDE plugins 514 enable element profiler 506 to process applications developed using different development platforms/environments. For example, a first IDE plugin 514 may enable element profiler 506 to analyze applications developed using JAVA to identify the elements and the attributes of the elements therein, and a second IDE plugin 514 may enable element profiler 506 to analyze applications developed using C # to identify the elements and the attributes of the elements therein, and so forth.

For example, upon assigning an identifier to an application and the individual pages of the application, element profiler 506 can analyze the application to identify the elements in the application and the attributes linked to the elements. In one implementation, element profiler 506 can examine the DOM structure of the individual pages of an application to identify the elements on the page and the attributes of the elements. Element profiler 506 can store information about the identified elements and the attributes, including the unique identification assigned to the application and the pages contained within the application, within web elements repository 510, where they can subsequently be retrieved and used. For example, information about an element and the attributes linked to the element can be retrieved and used to create the XPath and CSS Selectors for the element. In some embodiments, web elements repository 510 may correspond to a centralized storage repository or storage service within the computing environment of web application elements handler service 404. In some embodiments, element profiler 506 may store within web elements repository 510 a hierarchical representation (e.g., a linked list) of the elements on a page, along with the element attribution.

Element processing module 508 is operable to create the locators for the elements in an application. Element processing module 508 can utilize the information about elements and stored within web elements repository 510 about elements on the different pages of applications and the attributes linked to the elements stored within web elements repository 510 to create locators for the elements. In some embodiments, for a particular application, element processing module 508 can retrieve or query web elements repository 510 information about the elements in the application and the attributes linked to the elements. Element processing module 508 can then use the attribution of the element to create the XPath and CSS Selectors for the element. Element processing module 508 can then store the XPath and CSS Selectors created for the element within web elements repository 510 (e.g., store the created XPath and CSS Selectors as locators for the element). Further description of the creation of locators and other processing that can be implemented within element processing module 508 is provided below at least with respect to FIG. 7.

In some embodiments, element processing module 508 can validate the XPath and CSS Selectors created for an element for effectiveness in uniquely identifying or addressing the element. For example, element processing module 508 can test the XPath and each CSS selector to ensure that the XPath and CSS selectors are able to identify the element uniquely on the page. Element processing module 508 can then store the validated XPath and CSS Selectors (i.e., the XPath and CSS selectors which are able to identify the element uniquely) within web elements repository 510.

Service interface module 512 is operable to generate handler classes for accessing elements stored within web elements repository 510. In some embodiments, service interface module 512 can provide a UI which can be used to request handler classes for one or more elements. For example, a user, such as any of user 408 of FIG. 4, may use the provided UI to specify one or more elements and a locator for each specified element, and click/tap a UI element/control (e.g., a button labeled "Generate Handler") to request generation of handler classes for the specified elements. In response, service interface module 512 may generate the handler classes for the specified elements based on the provided inputs and provide the generated handler classes to the user.

Figure 6A:
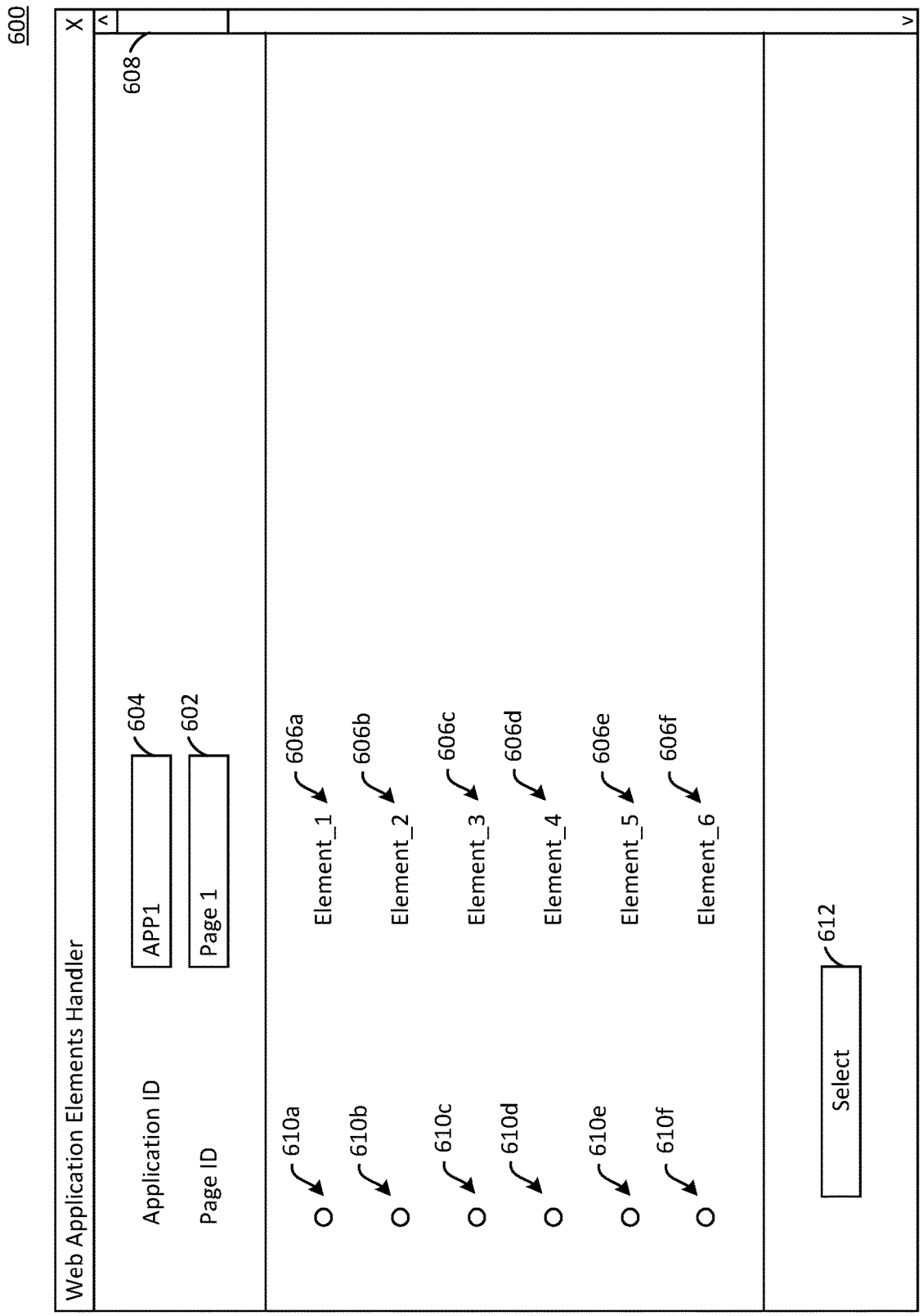
FIGS. 6A and 6B are pictorial diagrams showing an example user interface (UI) configured for requesting handler classes for one or more elements, in accordance with an embodiment of the present disclosure.
Figure 6B:
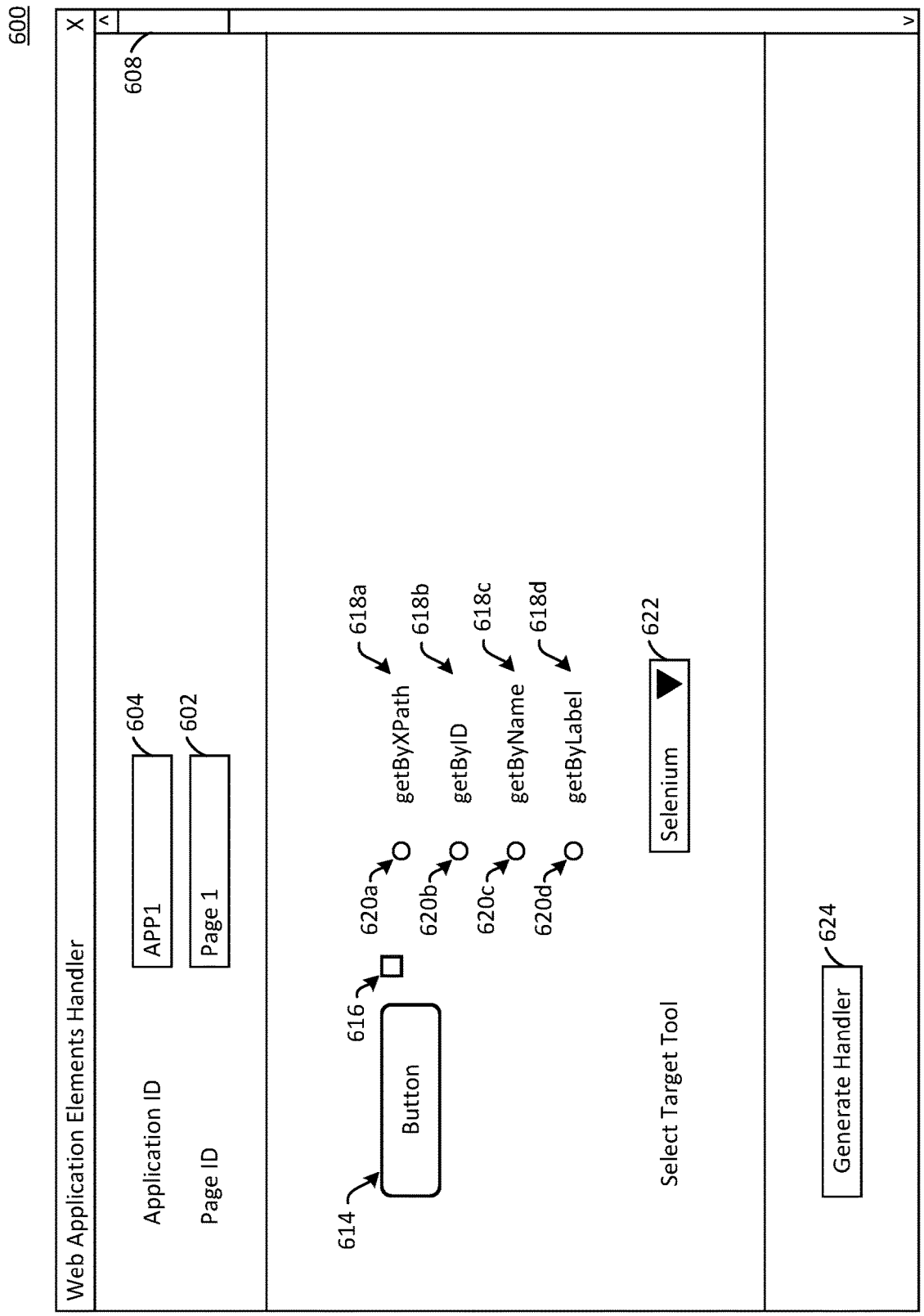

FIGS. 6A and 6B are pictorial diagrams showing an example user interface (UI) 600 configured for requesting handler classes for one or more elements, in accordance with an embodiment of the present disclosure. For example, illustrative UI 600 may be implemented by service interface module 512 of FIG. 5. In the example of FIGS. 6A and 6B and the following description thereof, it is assumed that a user (e.g., any of user 408 of FIG. 4) is using UI 600 to create handler classes for elements on page 1 of an application having an identifier APP1, as indicated by text boxes 602 and 604, respectively.

Referring to FIG. 6A, illustrative UI 600 may display a list of elements 606a-606e linked to page 1 of the application (e.g., list of elements that are on page 1 of the application). UI 600 may include a scrollbar 608 with which the user can display other elements which may be linked to page 1 of the application. UI 600 may also display six check circles 601a-610e for selecting each of elements 606a-606e and a button 612 for confirming the selection of any of elements 606a-606e and progressing to the nest steps in generating the handler classes for the selected elements. For example, the user may click upon check circle 610a to select element 606a and click/tap button 612 to request progressing to the next steps for the selected element(s).

Turning to FIG. 6B, in response to the user clicking/tapping button 612, UI 600 may display a button 614. For example, button 614 may be a pictorial representation of element 606a which was selected by the user. UI 600 may display a check box 616 for confirming the selection of button 614 (e.g., to confirm the selection of element 606a for generating the handler class). UI 600 may also display the locators (i.e., the accessibility) that are available for button 614. The displayed locators are the methods that are available for locating button 614 on page 1 of the application. In the example of FIG. 6B, UI 600 may display locators 618a-618d and check circles 620a-620d for selecting a desired locator. For example, locator 618a ("getByXPath") may in indicate that button 614 is accessible using XPath, locator 618b ("getByID") may in indicate that button 614 is accessible using the identifier attribute, locator 618c ("getByName") may in indicate that button 614 is accessible using the name attribute, and locator 618d ("getByLabel") may in indicate that button 614 is accessible using the label attribute. UI 600 may also display a dropdown 622 which may be used to select a test automation tool. For example, the user can use dropdown 622 to specify the test automation tool to be used in generating the test scripts (e.g., automated test cases). UI 600 may display a button 624 (e.g., labeled "Generate Handler") for requesting generation of handler classes for the selected elements based on the other inputs provided with the request (e.g., based on the accessibility selected for each selected element and the specified test automation tool. In response to the user clicking/tapping button 624, service interface module 512 may generate the handler classes for the selected elements and, in some implementations, provide the generated handler classes to the user via UI 600. For example, UI 600 may display an icon (not shown) that can be activated to view and/or download the generated handler classes. For example, the user may use the displayed icon to download the handler classes and use the handler classes to generate the test scripts.

Figure 7:
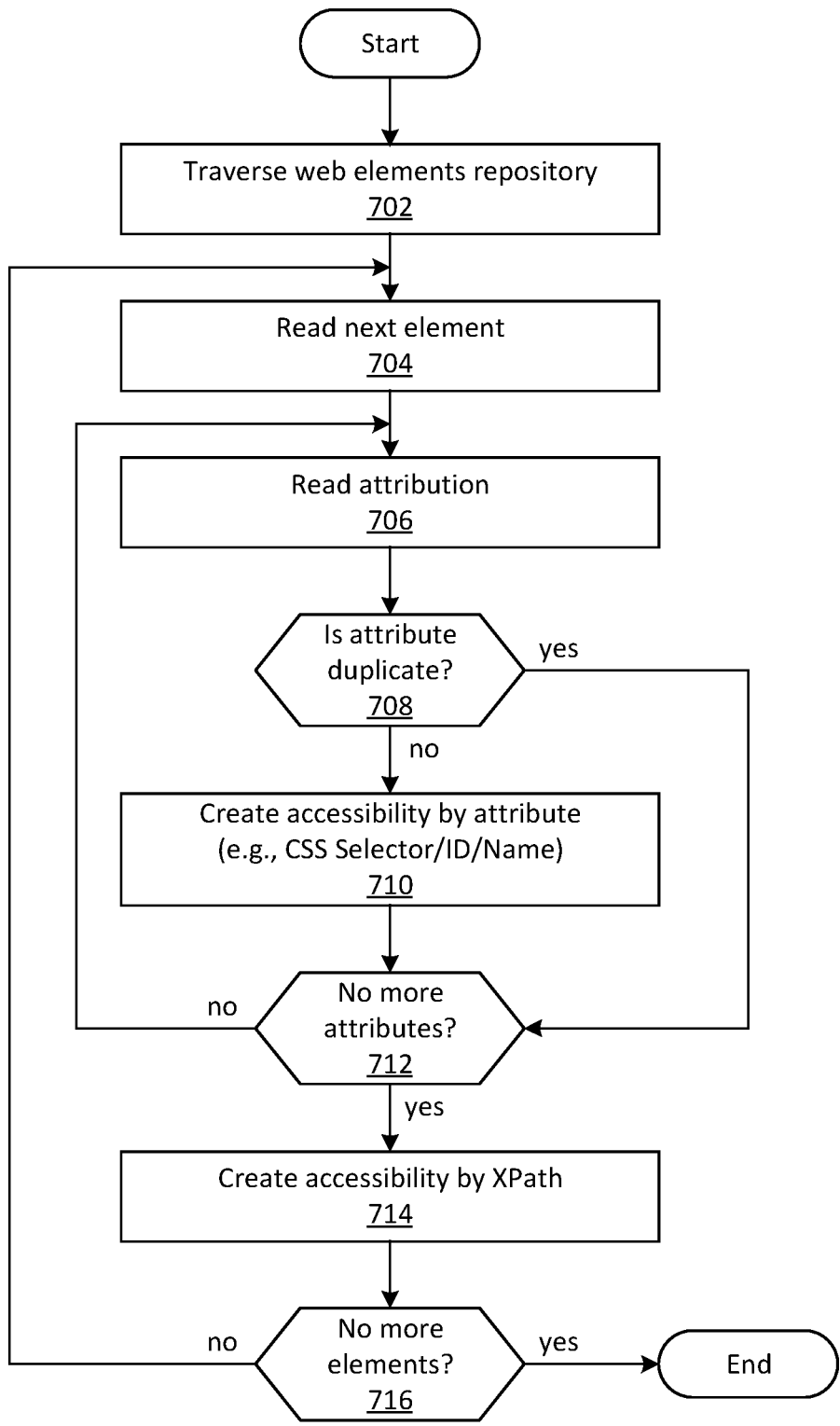
FIG. 7 is a flow diagram of an example process for creating locators for web elements, in accordance with an embodiment of the present disclosure.

FIG. 7 is a flow diagram of an example process 700 for creating locators for web elements, in accordance with an embodiment of the present disclosure. Illustrative process 700 may be implemented, for example, within web application elements handler service 404 and, particularly, within element processing module 508 of FIG. 5. In some embodiments, element processing module 508 may generate locators for the elements in an application upon the application being stored within web elements repository 510 (e.g., the information about the elements and the attributes of a new application being stored within web elements repository 510).

Figure 8:
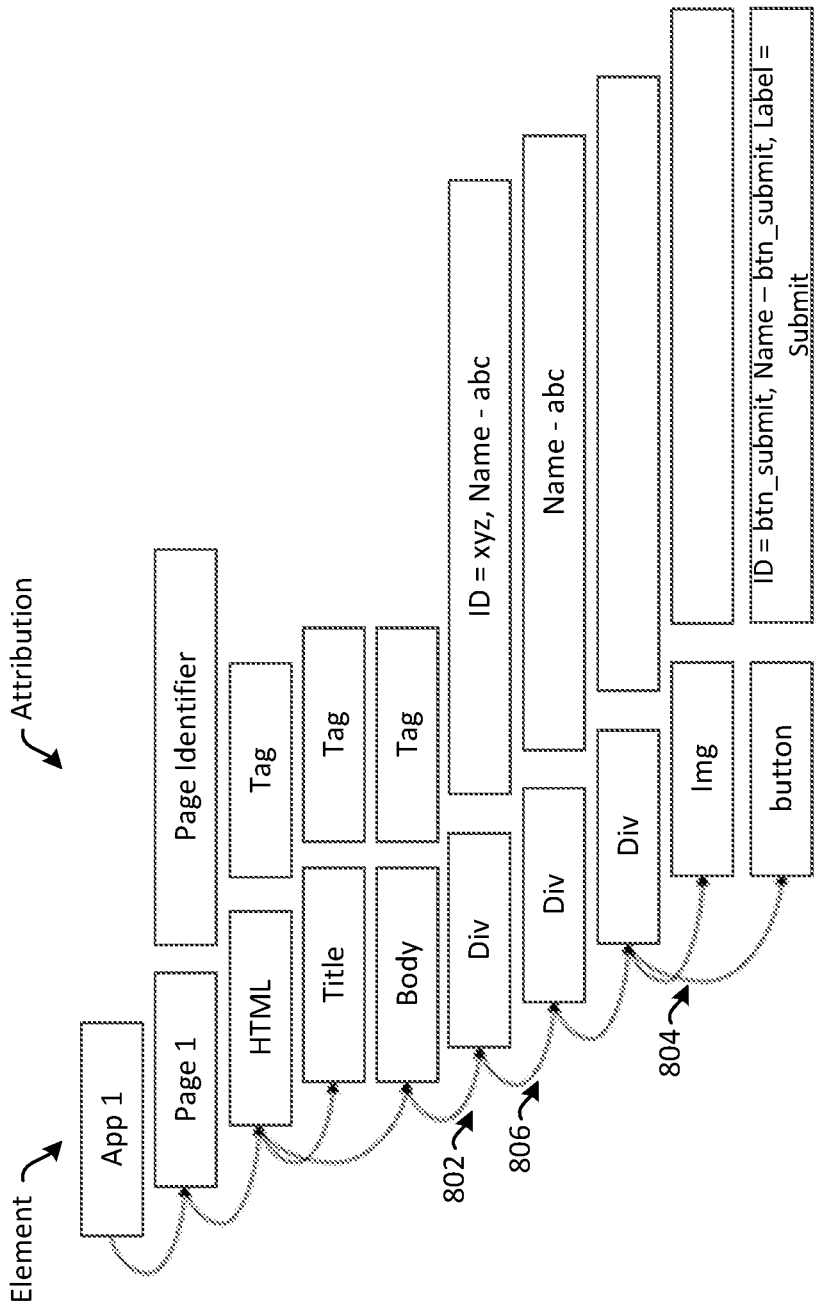
FIG. 8 is a diagram illustrating a hierarchical representation of elements on a page, in accordance with an embodiment of the present disclosure.

Referring to process 700 and with reference to the example illustrated in FIG. 8, at 702, a web elements repository (e.g., web elements repository 510 of FIG. 5) may be traversed. For example, the web elements repository may be traversed to locate the application that needs to be processed (e.g., locate the information about the elements and attributes of the application).

At 704, an element in the application that needs to be processed may be read for processing. At 706, an attribution of the element that is being processed may be read for processing. Referring to the example of FIG. 8, if an element 802 (the first "Div") is the element that is being processed, either the ID attribute or the Name attribute may be read since neither attribute has been processed. Note that in some cases an element may not have any attribution. For example, if an element 804 ("Img") is the element that is being processed, there is no attribution to read since element 804 does not have any attributes.

At 708, a check may be performed to determine whether the attribute is a duplicate. The check is to determine whether the attribute of the element that is being processed is a duplicate of an attribute of another element in the same page of the application. Note that the check is of attributes of other elements in the same page since, as previously mentioned, the pages in the application are uniquely identified. In the example of FIG. 8, if the Name attribute of element 802 is the attribute that is being processed, the attributes of the other elements on the page may be checked to determine whether the Name attribute is a duplicate of an attribute of the other elements. In this example, the Name attribute ("abc") is a duplicate of a Name attribute ("abc") of an element 806 (the second "Div"). In other words, element 802 and element 806 have the same Name attribute ("abc"). Since the Name attribute of element 802 is a duplicate, the Name attribute cannot not be used to access element 802. That is, element 802 is not accessible by its Name attribute since the Name attribute is a duplicate (e.g., the Name attribute does not identify element 802 uniquely on the page).

If, at 708, a determination is made that the attribute is not a duplicate, then, at 710, accessibility to the element by the attribute may be created. Accessibility to the element by the attribute (i.e., by the non-duplicate attribute) may be created since the attribute identifies the element uniquely on the page of the application. In the example of FIG. 8, if the ID attribute ("xyz") of element 802 is the attribute that is being processed, accessibility to element 802 by the ID attribute (e.g., a CSS Selector by ID, e.g., "getByID") may be created since the ID attribute of element 802 can be used to identify element 802 uniquely on the page. In the example, if the Name attribute ("abc") of element 802 is the attribute that is being processed, accessibility to element 802 by the Name attribute (e.g., a CSS Selector by Name, e.g., "getByName") is not created since the Name attribute of element 802 does not identify element 802 uniquely on the page.

Otherwise, if, at 708, a determination is made that the attribute is a duplicate or subsequent to creating accessibility by attribute at 710, at 712, a check may be performed to determine whether there are any more attributes to process. The check is to determine whether the element that is being processed has other attributes which need processing (e.g., check to determine whether all attributes of the element have been processed). If a determination is made that there are more attributes to process, then, at 706, processing of the attributes may continue by reading the next attribution of the element (e.g., read the next attribute of the element).

Otherwise, if, at 712, a determination is made that there are no more attributes of the element to process, then, at 714, accessibility to the element by XPath may be created. The XPath created for the element can be used to uniquely identify the element.

At 716, a check may be performed to determine whether there are any more elements to process. The check is to determine whether the application includes other elements which need processing (e.g., check to determine whether all elements of the application have been processed).

If, at 716, a determination is made that there are more elements to process, then, at 704, processing of the elements may continue with the next element of the application (e.g., read the next element of the application). Otherwise, if, at 716, a determination is made that there are no more elements to process, processing of the application may end. In some embodiments, the accessibility created for the elements in an application can be stored within the web elements repository (e.g., web elements repository 510 of FIG. 5).

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   analyzing, by a computing device, an application to identify one or more elements in the application and, for each element of the one or more elements, an attribution of the element; and
   for each element of the one or more elements:
   determining, by the computing device, whether an attribute of the element is a non-duplicate attribute or a duplicate attribute;
   removing, by the computing device, the duplicate attribute;
   creating, by the computing device, a first accessibility to the element by the non-duplicate attribute;
   creating, by the computing device, a second accessibility to the element by XPath;
   storing, by the computing device, the attribution of each element with the first accessibility and the second accessibility created for the element within a central web element repository, the central web element repository maintaining a hierarchical representation of the elements of the application and configured to support heterogeneous element locator demands;
   retrieving, by the computing device from the central web element repository, at least one of the first accessibility or the second accessibility of a first element of the one or more elements in the application;
   generating a handler class for the first element, wherein the handler class contains code for accessing the first element; and
   providing the generated handler class to another computing device for inclusion in a test script.

2. The method of claim 1, wherein analyzing the application includes examining a Document Object Model (DOM) structure of one or more pages of the application.

3. The method of claim 1, wherein the first accessibility includes a cascading style sheet (CSS) Selector.

4. The method of claim 3, wherein the CSS Selector includes a CSS Selector by Name.

5. The method of claim 3, wherein the CSS Selector includes a CSS Selector by ID.

6. The method of claim 3, wherein the CSS Selector includes a CSS Selector by Label.

7. The method of claim 1, wherein the handler class is generated based on an accessibility to the element selected for the handler class.

8. The method of claim 1, wherein the handler class is generated based on a test automation tool specified for the handler class.

9. A system comprising:
   one or more non-transitory machine-readable mediums configured to store instructions; and
   one or more processors configured to execute the instructions stored on the one or more non-transitory machine-readable mediums, wherein execution of the instructions causes the one or more processors to carry out a process comprising:
   analyzing an application to identify one or more elements in the application and, for each element of the one or more elements, an attribution of the element; and
   for each element of the one or more elements:
   determining whether an attribute of the element is a non-duplicate attribute or a duplicate attribute;
   removing the duplicate attribute;
   creating a first accessibility to the element by the non-duplicate attribute;
   creating a second accessibility to the element by XPath;
   storing the attribution of each element with the first accessibility and the second accessibility created for the element within a central web element repository, the central web element repository maintaining a hierarchical representation of the elements of the application and configured to support heterogeneous element locator demands;
   retrieving from the central web element repository at least one of the first accessibility or the second accessibility of a first element of the one or more elements in the application;
   generating a handler class for the first element, wherein the handler class contains code for accessing the first element; and providing the generated handler class to another computing device for inclusion in a test script.

10. The system of claim 9, wherein analyzing the application includes examining a Document Object Model (DOM) structure of one or more pages of the application.

11. The system of claim 9, wherein the first accessibility includes a CSS Selector.

12. The system of claim 11, wherein the CSS Selector includes one of a CSS Selector by Name, a CSS Selector by ID, or a CSS Selector by Label.

13. The system of claim 9, wherein the handler class is based on an accessibility to the element selected for the handler class.

14. The system of claim 9, wherein the handler class is based on a test automation tool specified for the handler class.

15. A non-transitory machine-readable medium encoding instructions that when executed by one or more processors cause a process to be carried out, the process including:
  analyzing an application to identify one or more elements in the application and, for each element of the one or more elements, an attribution of the element; and
  for each element of the one or more elements:
    determining whether an attribute of the element is a non-duplicate attribute or a duplicate attribute;
    removing the duplicate attribute;
    creating a first accessibility to the element by the non-duplicate attribute;
    creating a second accessibility to the element by XPath;
    storing the attribution of each element with the first accessibility and the second accessibility created for the element within a central web element repository, the central web element repository maintaining a hierarchical representation of the elements of the application and configured to support heterogeneous element locator demands:
  retrieving from the central web element repository at least one of the first accessibility or the second accessibility of a first element of the one or more elements in the application;
  generating a handler class for the first element, wherein the handler class contains code for accessing the first element; and
  providing the generated handler class to another computing device for inclusion in a test script.

16. The machine-readable medium of claim 15, wherein analyzing the application includes examining a Document Object Model (DOM) structure of one or more pages of the application.

17. The machine-readable medium of claim 15, wherein the first accessibility includes a CSS Selector.

* * * * *